D. C. BROWN.
Churn.
No. 26,880. Patented Jan'y 24, 1860.
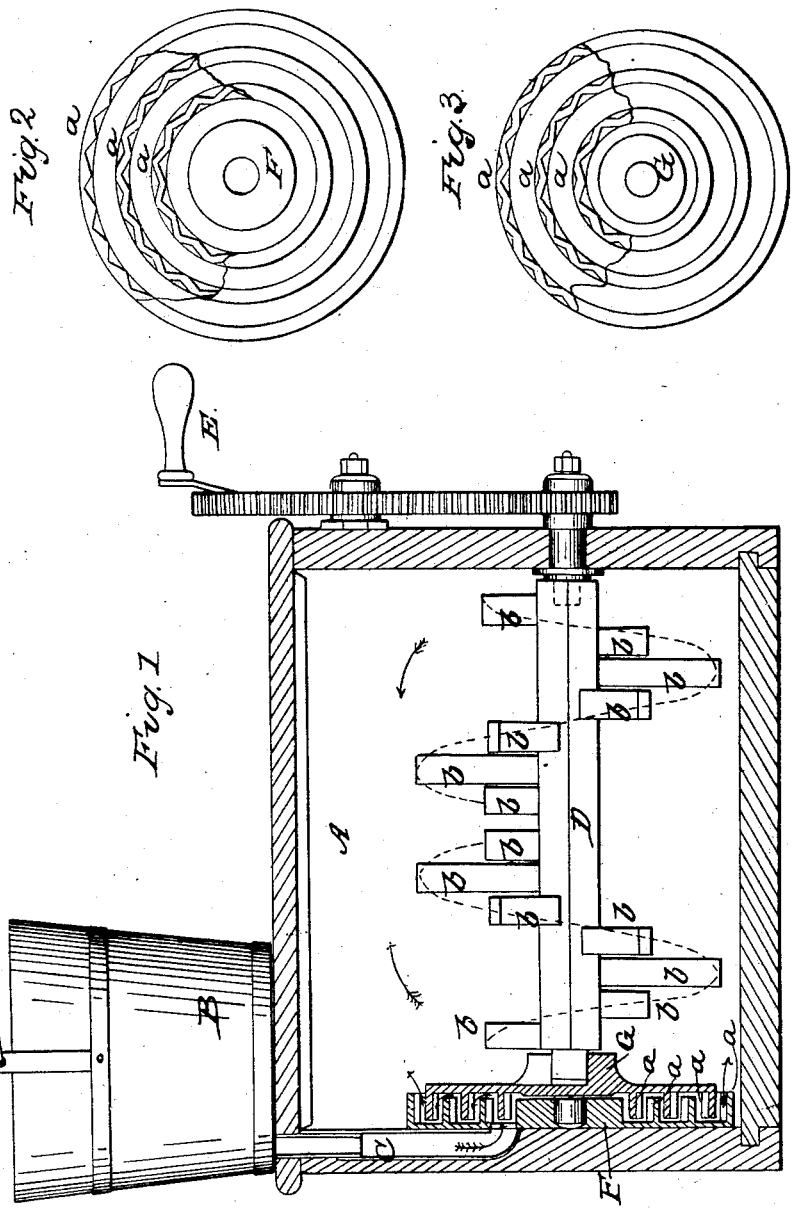

UNITED STATES PATENT OFFICE.

D. C. BROWN, OF NEW YORK, N. Y.

CHURN.

Specification of Letters Patent No. 26,880, dated January 24, 1860.

*To all whom it may concern:*

Be it known that I, DANIEL C. BROWN, of the city, county, and State of New York, have invented a new and Improved Churn; and I do hereby declare that the following is a full and exact description thereof, reference being had to the accompanying drawings and to the letters of reference marked thereon.

Figure 1 is a side view in section.

A, is the body of the churn, consisting of a rectangular case or box of any required dimensions, adapted for the quantity of cream or milk to be acted upon at one time. The form and size are in no respect essential, except with reference to the application of the agitators &c, hereafter described.

B is a supplying hopper (represented in the form of a bucket) into which the fluid is first poured. It may be of any convenient and suitable shape. The fluid passes from this, down the spout C, into the churn. This is jointed, a part being attached to the hopper and lid of the churn, while the lower part is a fixture.

F, G, is an improved agitator. It consists of two disks of wood or metal, one of which (G) revolves while the other (F) is stationary, through and between which the fluid to be acted upon is passed. The disks have upon their inner faces, a series of rings (a, a, a, &c, Figs. 1, 2 and 3) projecting inward therefrom. The rings are formed or placed at well defined distances apart, giving spaces between, which are occupied, respectively, by the rings on the opposite disk. Thus those rings on the side of the disk G enter and revolve in the spaces between similar rings on the disk F, and likewise those on the latter enter between the former, leaving a small space around and between each, there being no surfaces in actual or near contact as in guiding. The rings are also serrated or corrugated upon each of their sides, in lateral lines, entirely around their circumferences, as shown in part at a, a, a, Figs. 2 and 3, which figures are inside views of the disks. The disk G has a projecting center or journal that has its bearing in the center of the disk F, on which it revolves in conjunction with the agitator D, below described.

The spout C enters the disk F at near its center. The milk or cream thus entering while the disk G is in rapid motion, it will be seen that (by the centrifugal force developed) the fluid will be forced outward, but, meeting the obstruction of the rings, will be checked—accumulate to some extent until forced to climb over and around them, successively advancing thus and being checked and being thereby subjected to the action of the corrugated surfaces upon each side of the rings, each one of which may represent a beater in its best form, acting upon a thin stratum of fluid by both action and reaction. By this means the most thorough, uniform, and complete beating and agitation is obtained and by an arrangement which is in itself exceedingly simple.

The violent concussion to which the mass of cream is thus subjected in detail will be of itself sufficient, or nearly so, to break the minute globular sacs, but further and more gentle action is useful for completely separating the butter. This is effected as follows: Connected with the disk G is a driving shaft D, having around its hexagonal sides a series of projecting pins or slats (b, b, b, &c) in length extending nearly to the sides of the case and constituting an auxiliary agitator and gatherer. These pins are set in spiral direction, not continuously from end to end, but commencing at either end, approaching and terminating at a common center, and are so arranged in their spirals with reference to the direction in which motion is given that the fluid in which it revolves is drawn to the center. It is also changed in its direction, as it is acted upon by one and another of the pins, from that it would receive were they formed in a straight line or as a common dasher, in which case the fluid would be kept in motion in one direction only (around), but by this improved method is continually changing its position laterally, being acted upon by both forces, that of the screw and of its direct revolution; but, what is of the most importance, the fluid is by this means drawn inward from the ends to the center and is there subjected to the reacting forces of counter currents, and thus the butter as it is formed gathers at the center, where it can readily be removed; hence the spiral agitator, as here used, acts the part of separator and gatherer.

The shaft D has a square socket at one end, where it couples with the geared stud, giving it motion, and at the other end it enters into the hub of the disk G and is secured there, while in action, by a pin or spring. Both the disk and shaft are thus readily removed for cleaning &c. Motion is given to the whole by a pair of gear wheels and crank E, which will need no further description.

It has been found in practice objectionable to grind the fluids between surfaces in absolute contact, as in crushing the fatty globules by sudden force in such manner the butter so obtained is of a soft or oily nature and is necessarily impaired in value. The kind of agitation seemingly best adapted for this purpose is where the mass of cream is acted upon in detail successively and uniformly and at the same time is subjected to repeated violent concussions and changes or reversals of its currents. These conditions are met, it is believed, by the improved means herein described in the fullest degree and the butter is produced in the most simple, effectual, and rapid manner.

Having thus described my invention, what I claim as new and desire to secure by Letters Patent therein, is—

The disks F, and G, in their combined action, having upon their inner sides the rings a, a, a, &c, all in the manner substantially and for the purpose specified.

DANIEL C. BROWN.

Witnesses:
N. BARLOW,
L. PITKIN.